(12) United States Patent
Eckhoff et al.

(10) Patent No.: US 9,482,128 B2
(45) Date of Patent: Nov. 1, 2016

(54) METHOD FOR REGENERATING NOX STORAGE CATALYTIC CONVERTERS OF DIESEL ENGINES WITH LOW-PRESSURE EGR

(75) Inventors: Stephan Eckhoff, Alzenau (DE); Stefan Franoschek, Nettetal (DE); Frank Adam, Freigericht (DE)

(73) Assignee: UMICORE AG & CO. KG, Hanau-Wolfgang (DE)

( * ) Notice: Subject to any disclaimer, the term of this patent is extended or adjusted under 35 U.S.C. 154(b) by 0 days.

(21) Appl. No.: 14/116,754

(22) PCT Filed: May 9, 2012

(86) PCT No.: PCT/EP2012/058547
§ 371 (c)(1),
(2), (4) Date: Dec. 2, 2013

(87) PCT Pub. No.: WO2012/152833
PCT Pub. Date: Nov. 15, 2012

(65) Prior Publication Data
US 2014/0090362 A1      Apr. 3, 2014

(30) Foreign Application Priority Data

May 10, 2011   (DE) .......................... 10 2011 101 079

(51) Int. Cl.
*F01N 3/20*     (2006.01)
*F01N 3/10*     (2006.01)
(Continued)

(52) U.S. Cl.
CPC ............... *F01N 3/10* (2013.01); *F01N 3/0821* (2013.01); *F01N 3/0885* (2013.01); *F02D 41/0055* (2013.01); *F02D 41/0275* (2013.01); *F02M 26/06* (2016.02); *F01N 2240/36* (2013.01); *F02B 37/00* (2013.01); *F02D 41/028* (2013.01); *F02D 41/042* (2013.01); *F02D 41/12* (2013.01);
(Continued)

(58) Field of Classification Search
CPC ............ F01N 3/0885; F01N 2240/36; F02D 41/0275; F02M 25/0709
USPC .......................................... 60/278, 286, 295
See application file for complete search history.

(56) References Cited

U.S. PATENT DOCUMENTS 4,961,917 A   10/1990   Byrne
5,974,794 A   11/1999   Gotoh et al.
(Continued)

FOREIGN PATENT DOCUMENTS

DE   39 40 758   6/1991
DE   44 35 073   4/1995
(Continued)

OTHER PUBLICATIONS

Machine translation of JP 2006-200362 A, accessed on Feb. 3, 2016.*
(Continued)

*Primary Examiner* — Jonathan Matthias
(74) *Attorney, Agent, or Firm* — Smith, Gambrell & Russell, LLP

(57) ABSTRACT

The invention relates to a method for regenerating nitrogen oxide storage catalytic converters and to a correspondingly adapted exhaust-gas purification system for lean-burn engines. In particular, the present invention relates to the regeneration of nitrogen oxide storage catalytic converters during special driving situations of the vehicle.

18 Claims, 1 Drawing Sheet

(51) Int. Cl.
*F01N 3/08* (2006.01)
*F02D 41/00* (2006.01)
*F02D 41/02* (2006.01)
F02D 41/04 (2006.01)
F02D 41/12 (2006.01)
F02B 37/00 (2006.01)

(52) U.S. Cl.
CPC ....... F02D2041/0022 (2013.01); F02M 26/05 (2016.02); Y02T 10/20 (2013.01); Y02T 10/22 (2013.01); Y02T 10/47 (2013.01)

(56) References Cited

U.S. PATENT DOCUMENTS

| | | | |
|---|---|---|---|
| 6,082,100 | A | 7/2000 | Boegner et al. |
| 6,276,130 | B1 | 8/2001 | Ito et al. |
| 6,756,336 | B2 | 6/2004 | Kasahara et al. |
| 6,767,855 | B2 | 7/2004 | Kasahara et al. |
| 6,978,601 | B1 | 12/2005 | Twigg |
| 7,313,911 | B2 | 1/2008 | Pfeifer et al. |
| 7,717,099 | B2 | 5/2010 | Nagae et al. |
| 8,245,499 | B2 | 8/2012 | Vigild et al. |
| 8,407,988 | B2 | 4/2013 | Bidner et al. |
| 8,475,753 | B2 | 7/2013 | Eckhoff et al. |
| 2002/0038654 | A1* | 4/2002 | Sasaki .............. B60K 6/485 123/568.11 |
| 2002/0081238 | A1 | 6/2002 | Duvinage et al. |
| 2002/0104312 | A1 | 8/2002 | Hoffman et al. |
| 2004/0050375 | A1 | 3/2004 | Arnold |
| 2008/0134648 | A1 | 6/2008 | Duvinags et al. |
| 2009/0019836 | A1* | 1/2009 | Nagaoka et al. ............... 60/285 |
| 2009/0038308 | A1* | 2/2009 | Nagae ............... 60/602 |
| 2009/0093796 | A1 | 4/2009 | Pfeffer et al. |
| 2010/0018187 | A1 | 1/2010 | Matsumoto et al. |
| 2011/0000189 | A1 | 1/2011 | Mussmann et al. |
| 2011/0072791 | A1 | 3/2011 | Bidner et al. |
| 2011/0072801 | A1 | 3/2011 | Lupescu et al. |
| 2011/0120093 | A1 | 5/2011 | Eckhoff et al. |
| 2011/0131949 | A1 | 6/2011 | Adams et al. |
| 2011/0277450 | A1 | 11/2011 | Hoyer et al. |
| 2012/0148464 | A1 | 6/2012 | Eckhoff et al. |
| 2012/0240557 | A1 | 9/2012 | Kawaguchi et al. |
| 2014/0123630 | A1 | 5/2014 | Eckhoff et al. |

FOREIGN PATENT DOCUMENTS

| | | | |
|---|---|---|---|
| DE | 196 14 540 | | 10/1997 |
| DE | 196 36 790 A1 | | 3/1998 |
| DE | EP 0829623 A1 * | | 3/1998 ......... B01D 53/9481 |
| DE | 197 16 275 C1 | | 9/1998 |
| DE | 197 53 738 | | 6/1999 |
| DE | 10308288 A1 | | 9/2004 |
| DE | 103 35 785 | | 3/2005 |
| DE | 10 2005 056955 A1 | | 5/2007 |
| DE | 10 2007 039249 A1 | | 2/2009 |
| DE | 10 2007 060623 A1 | | 6/2009 |
| DE | 10 2009 039 249.1 | | 8/2009 |
| DE | 10 2009 039 250.5 | | 8/2009 |
| DE | 102008015600 | | 10/2009 |
| DE | 10 2008 048854 A1 | | 4/2010 |
| EP | 0 427 970 | | 5/1991 |
| EP | 0 800 856 | | 10/1997 |
| EP | 0 869 267 A2 | | 10/1998 |
| EP | 1 001 154 A2 | | 5/2000 |
| EP | 1 026 385 A2 | | 8/2000 |
| EP | 1 046 423 | | 10/2000 |
| EP | 0 872 633 B1 | | 3/2002 |
| EP | 1 227 232 A2 | | 7/2002 |
| EP | 0 913 559 B1 | | 5/2004 |
| EP | 1 398 069 | | 4/2006 |
| EP | 1 837 497 | | 9/2007 |
| EP | 1 309 775 | | 6/2008 |
| EP | 1 663 458 | | 1/2009 |
| EP | 2 042 225 | | 4/2009 |
| EP | 2 042 226 | | 4/2009 |
| EP | 2 112 339 A1 | | 10/2009 |
| EP | 2 123 345 | | 8/2010 |
| EP | 2 283 213 | | 2/2011 |
| JP | 6257519 A | | 9/1994 |
| JP | 2006200362 A * | | 8/2006 |
| WO | 95/35152 | | 12/1995 |
| WO | 01/19500 A1 | | 3/2001 |
| WO | 2004/076829 | | 9/2004 |
| WO | 2007/137675 | | 12/2007 |
| WO | 2008/101585 | | 8/2008 |
| WO | 2008/106523 | | 9/2008 |
| WO | 2008/122866 A2 | | 10/2008 |
| WO | 2009/129903 | | 10/2009 |
| WO | 2011/023332 A1 | | 3/2011 |

OTHER PUBLICATIONS

International Search Report for Application No. PCT/EP2012/058547 dated Sep. 25, 2012 (in English).
"Development of New Concept Three-Way Catalyst for Automotive Lean-Burn Engines" N. Miyoshi et al, SAE paper 950809, 1995.
International Search Report for PCT/EP2012/062138; mailed Apr. 12, 2012.
Theis, Joseph R., et al. "Effect of Lean Operation on the HC Activity of Three-Way Catalysts". 22nd North Am. Catal. Soc. Meeting, 2011. 1 Page.
Eckhoff, S. (dissertation) "Untersuchungen zur katalytischen Aktivität eines Dieseil-DeNOx-Katalysators auf der Basis von Pt/Al$_2$O$_3$" ["Investigation on the Catalytic activity of a diesel-DeNOx-catalyst based on Pt/Al$_2$O$_3$"], 1998. pp. 1-149.
Hauptmann, W., et al. "Inverse hysteresis during the NO oxidation on Pt under lean conditions". Applied Catalysis B: Environmental 93, 2009, pp. 22-29.
Engler, B., et al. "Catalytically Activated Diesel Particulate Traps— New Development and Applications", 1986, SAE Technical Paper Series 860007. 1986. pp. 1-9.
Written Opinion for PCT/EP2012/058547 dated Nov. 10, 2013. (6 pages).
International Preliminary Report on Patentability for PCT/EP2012/058547 dated Nov. 12, 2013. (7 pages).

\* cited by examiner

METHOD FOR REGENERATING NOX STORAGE CATALYTIC CONVERTERS OF DIESEL ENGINES WITH LOW-PRESSURE EGR

The invention relates to a method for regenerating nitrogen oxide storage catalytic converters and to a correspondingly adapted exhaust-gas purification system for lean-burn engines, in particular, the present invention relates to the regeneration of nitrogen oxide storage catalytic converters during special driving situations of the vehicle.

Future exhaust-gas legislation limits the quantity of nitrogen oxides (NOx) in the exhaust gas of lean-burn engines to such an extent that catalytic aftertreatment of the nitrogen oxides is necessary. The envisaged reduction of the nitrogen oxides to form nitrogen is however difficult owing to the high oxygen content in the exhaust gas of lean-burn internal combustion engines. Known methods are based either on the use of nitrogen oxide storage catalytic converters (NOx storage catalyst, NSC, LNT) or are methods for selective catalytic reduction (SCR), usually by means of ammonia as reducing agent, on a suitable catalytic converter, or SCR catalytic converter for short. Combinations of said methods are also known in which, for example, ammonia is produced as a secondary emission on an upstream nitrogen oxide storage catalytic converter under rich operating conditions, which ammonia is initially stored in an SCR catalytic converter arranged downstream before being utilized, in a subsequent lean-burn operating phase, for reducing nitrogen oxides passing the nitrogen oxide storage catalytic converter, DE 102007060623 describes a series of variants, which are present in the prior art, of exhaust-gas purification systems with denitrogenation devices.

Nitrogen oxide storage catalytic converters are used for removing the nitrogen oxides contained in the lean exhaust gas of so-called lean-burn engines (diesel, lean GDI). Here, the purification action is based on the fact that, in a lean-burn operating phase (storage phase, lean operation) of the engine, the nitrogen oxides are stored by the storage material of the catalytic converter in the form of nitrates. In a subsequent rich operating phase (regeneration phase, rich operation. DeNOx phase) of the engine, the previously formed nitrates are broken down and, during the rich operation, the nitrogen oxides which are released again are converted, with the rich exhaust-gas constituents which have a reducing action, to form nitrogen, carbon dioxide and water. Rich constituents of the exhaust gas include inter alia hydrocarbons, carbon monoxide, ammonia and hydrogen.

The mode of operation of nitrogen oxide storage catalytic converters is described in detail in the SAE document SAE 950809. The composition of nitrogen oxide storage catalysts is well known to a person skilled in the art. The nitrogen oxide storage materials are generally base compounds of the alkali or earth alkali metals such as for example oxides, hydroxides or carbonates of barium and strontium, which are applied to suitable substrate materials in finely distributed form. Furthermore, a nitrogen oxide storage catalyst also has catalytically active noble metals from the platinum group, and oxygen storage materials. Said composition provides a nitrogen oxide storage catalytic converter, under stoichiometric operating conditions, with the function of a three-way catalytic converter (DE102009039249 and the literature cited therein).

The storage phase for nitrogen oxides (lean-burn operation) conventionally lasts 100 to 2000 seconds and is dependent on the storage capacity of the catalytic converter and the concentration of the nitrogen oxides in the exhaust gas. In the case of aged catalytic converters with reduced storage capacity, the duration of the storage phase may however also fall to 50 seconds and less. The regeneration phase (rich mode) is in contrast always significantly shorter and lasts only a few seconds (5 s-20 s). The exhaust gas emerging from the nitrogen oxide storage catalytic converter during the regeneration has substantially no more pollutants, and is of approximately stoichiometric composition. Its air ratio $\lambda$ (lambda: indicates the ratio of fuel to air in the exhaust gas—see below) is approximately equal to 1 during this time. At the end of the regeneration phase, the released nitrogen oxides and the oxygen bound to the oxygen storage components of the catalytic converter are no longer sufficient to oxidize all of the rich exhaust-gas constituents. A breakthrough of said constituents through the catalytic converter therefore occurs, and the air ratio falls to a value below 1. Said breakthrough signals the end of the regeneration, and can be registered by means of a so-called lambda probe downstream of the storage catalytic converter.

For European applications, a preferred aftertreatment system comprises a close-coupled nitrogen oxide storage catalytic converter or NOx storage catalytic converters (LNT, NSC, NSR) followed by a catalytically coated filter. Modern lean-burn engines are optimized for low fuel consumption and often comprise a turbocharger and exhaust-gas recirculation systems (EGR) for engine-internal reduction of the NOx emissions. In this way, the exhaust-gas temperature is reduced considerably in relation to older diesel engines. Low exhaust-gas temperatures however reduce both the efficiency of the accumulation of the nitrogen oxides in the nitrogen oxide storage catalytic converter and also the efficiency of the regeneration of the NSC, during which, by means of a rich exhaust-gas mixture, the stored nitrogen oxides are released and converted to nitrogen.

In all external exhaust-gas recirculation systems, a pressure gradient from the exhaust-gas side to the fresh-air side must be present in order to permit the transfer flow of the exhaust gas. This means that exhaust-gas recirculation is possible only in those engine rotational speed/load ranges in which at least this condition is met. In the case of high-pressure (HP) EGR systems, the exhaust gas is extracted upstream of the turbine of the turbocharger and is supplied to the fresh air downstream of the compressor of the turbocharger. In the case of low-pressure (LP) EGR systems, the exhaust gas is extracted downstream of the turbine and supplied to the fresh air upstream of the compressor of the turbocharger (DE 102005056955). Low-pressure EGR systems permit exhaust-gas recirculation over a broader characteristic map range and with higher recirculation rates than HP EGR systems. To prevent accumulations of soot and hydrocarbons in the turbine and the fresh-air path in low LP EGR systems, the exhaust gas is generally extracted downstream of a particle filter. Combinations of both systems (HP and LP) are likewise known (JP 6257519, US 2004050375).

Efficient regeneration of a nitrogen oxide storage catalytic converter is normally possible only at temperatures above 250° C. At lower temperatures, owing to the reduced activity of the NOx storage catalytic converter, a part of the stored nitrogen oxides can be desorbed from the catalytic converter without simultaneously being reduced, as a result of which NOx emissions are increased. In the New European Driving Cycle (NEDC), this means that a regeneration first becomes possible in the extra-urban part at the end of the driving cycle, because it is here that the exhaust-gas temperatures required for fast and efficient NOx reduction are reached for the first time. It would however be desirable to also be able to carry out an efficient regeneration at lower temperatures (in urban driving situations) in order to be able to ensure efficient NOx aftertreatment even during longer journeys at low speeds. At present, therefore, it is necessary in said driving situations to heat the exhaust system for the regeneration in order to be able to carry out an efficient regeneration, which inevitably entails an increase in fuel consumption and also an increase in HC/CO emissions.

As described above, the regeneration of a storage catalytic converter is thus normally associated with short emissions peaks of hydrocarbons and carbon monoxide, which are further intensified by the following effect: the exhaust line between the engine and storage catalytic converter typically has a finite length. During the switch from rich operation to lean operation, the entire exhaust line is still filled with rich exhaust gas which, after the switch, is discharged via the catalytic converter into the environment by the now lean exhaust gas of the engine. The catalytic converter can no longer purify said residual fraction of rich exhaust gas, because the previously stored oxidizing constituents have already been consumed during the rich operation. An intensified emissions peak of hydrocarbons and carbon monoxide thus occurs at the end of a regeneration.

The operation of a diesel engine with rich exhaust gas is generally restricted to low engine rotational speeds (lower than 2000 to 3000 rpm) and medium mean effective pressures (of 2-4 to 12-14 bar). This restriction arises in that firstly a stable combustion in the cylinder must be ensured, secondly excessively high cylinder internal pressures must be avoided, and thirdly excessively high exhaust-gas temperatures must be avoided. In the case of an unstable or substantially incomplete combustion in the combustion chamber, relatively large quantities of unburned fuel would be conducted across the nitrogen oxide storage catalytic converter and oxidized there. This firstly leads to high temperatures in the nitrogen oxide storage catalytic converter and consequently to thermal damage to the catalytic converter. Secondly, the oxidation of the fuel in the nitrogen oxide storage catalytic converter may be incomplete, which leads to increased carbon monoxide and hydrocarbon emissions. In the case of excessively high exhaust-gas temperatures, the turbocharger and the nitrogen oxide storage catalytic converter may be damaged.

It was therefore the problem of the present invention to specify a method for regenerating nitrogen oxide storage catalytic converters and a corresponding system for exhaust-gas purification of an internal combustion engine operated predominantly in a lean-burn mode, which system assists in reducing the nitrogen oxides by means of a nitrogen oxide storage catalytic converter. Firstly, the method should make it possible for the regeneration of the storage catalytic converter to be carried out even in driving situations in which the exhaust-gas temperature is in fact too low, but without the need for special heating of the storage catalytic converter. Secondly, the method should make it possible for the regeneration of the storage catalytic converter to be carried out even in engine operating situations in which it was hitherto not possible to set rich exhaust-gas conditions for the regeneration of the nitrogen oxide storage catalytic converter. Here, the method and the system should be superior to the corresponding known measures from the prior art from economical and ecological aspects, that is to say should inter alia also be capable of adhering to future exhaust-gas limit values.

Said problems, and further problems not mentioned here but which are obvious to a person skilled in the art from the prior art, are solved by means of a regeneration method and a system under the present invention. Preferred embodiments of the inventive method and system under the present invention are described below:

DETAILED DESCRIPTION

Figure 1:
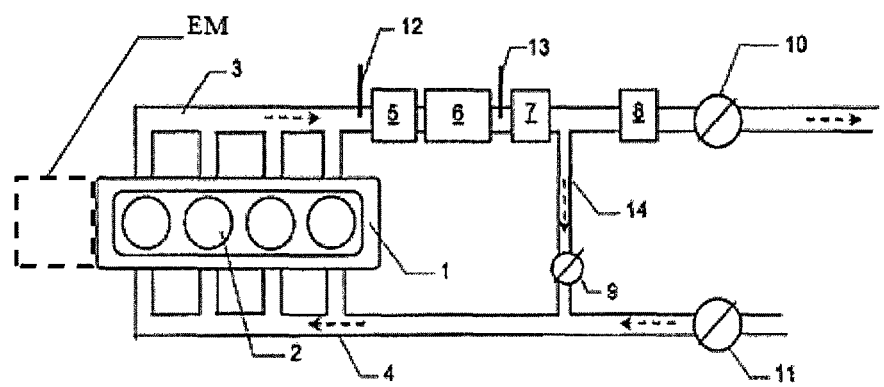
FIG. 1 shows a first system layout.

By virtue of the fact that, in a method for regenerating a nitrogen oxide storage catalytic converter (5) which is arranged in the exhaust line (3) of a lean-burn engine (1), wherein the engine (1) is provided with a device for low-pressure exhaust-gas recirculation, and a low-pressure EGR valve (9) is arranged in the low-pressure EGR line (14) and a device for reducing exhaust-gas discharge (10), such as for example an exhaust-gas flap, and/or a device for reducing the intake air (11), such as for example a throttle flap, the regeneration is carried out during overrun operation of the engine, in such a way that, with throttling of the intake air by means of the device (11) and/or reduction of the discharge of the exhaust gases by means of the device (10), the exhaust gas is conducted substantially in a circuit through the low-pressure EGR valve (9) via the engine (1) and the nitrogen oxide storage catalytic converter (5), and during this time an air-fuel mixture is set which corresponds to a lambda value of $\leq 1$, the solution to the stated problems is attained in an extremely simple but no less advantageous manner.

Depending on the duration of the overrun operation, the regeneration with a high low-pressure EGR fraction may last significantly longer (5-20 s) than a normal regeneration (3-5 s). Here, however, no greater quantities of HC/CO are emitted. As a result of the fact that the exhaust gas is conducted in a circuit and therefore is brought into contact with the catalytic converter several times, the efficiency of the exhaust-gas purification can be considerably increased. In this way, the nitrogen oxides are reduced more efficiently, and the nitrogen oxide storage catalytic converter is effectively emptied even at low exhaust-gas temperatures, which possibly also reduces noble metal procurement costs. Furthermore, the nitrogen oxide storage catalytic converter will cool down less during the overrun operation with a high low-pressure EGR fraction than under normal overrun operation conditions, in which the cold intake air is conducted, without combustion, directly through the engine and across the catalytic converters, which can inter alia lead to the nitrogen oxide storage catalytic converter being cooled down to below its active temperature upon the resumption of load operation of the engine.

As has just been explained, the regeneration of the nitrogen oxide storage catalytic converter is carried out at a time at which the engine is not doing any positive work, and therefore normally no fuel is supplied to the engine, but the engine is nevertheless turning over, driven by the (inertial or gravitational) mass of the vehicle. This is the case when the engine is in so-called overrun operation. Such operation arises for example when a deceleration phase is initiated, for example as a result of braking (if appropriate by means of an engine brake) of the vehicle, that is to say the speed of the vehicle decreases and no more fuel is supplied to the engine. In this phase, the engine is however still coupled to the transmission, and a gear is engaged. Here, usually only air is pumped via the intake manifold through the turning-over engine and into the exhaust system. Such operation arises for example when approaching a red light or when rapidly approaching a slower-moving vehicle.

In hybrid drives in which, aside from the internal combustion engine, electric motors are also used for propelling the vehicle, overrun operation of the internal combustion engine may also be effected in other driving situations, in order to utilize said overrun operation for the regeneration according to the invention of the nitrogen oxide storage catalytic converter. Here, it is also possible for the internal combustion engine to be turned over when the vehicle is at a standstill or being driven, by virtue of said internal combustion engine and possibly additionally the vehicle being driven by the electric motor. The overrun operation of the engine is thus effected by the electric motor. In the case of hybrid drives, therefore, it is possible for the regeneration according to the invention of the nitrogen oxide storage catalytic converter to be expanded to all driving situations in which the drive power of the electric motor is sufficient for driving the vehicle and the internal combustion engine. This is the case in particular in urban driving situations.

In a further preferred embodiment of the invention overrun operation is likewise to be understood to mean a driving condition which takes place upon the shut-down or during the shut-down of the engine. Here, a switch is made to rich exhaust gas and a high low-pressure EGR rate in the above-described way in order to flush through the nitrogen oxide storage catalytic converter with rich exhaust gas, and thereby at least partially regenerate the nitrogen oxide storage catalytic converter, during the shut-down of the engine. To shut down the engine, the conversion of heat into mechanical work (induced power) must be reduced such that said power is no longer sufficient to completely overcome the friction losses of the engine. This is generally achieved by stopping the generation of heat during the working stroke in the cylinder. In the case of spark-ignition engines, this was previously realized by shutting off the ignition (ignition spark). In the case of diesel engines and modern spark-ignition engines, this is realized by shutting off the fuel supply. In the situation according to the invention, the generation of heat in the cylinder is achieved by shutting off the air/oxygen supply, while the supply of fuel initially continues. Here, the continued turning-over of the engine with the transmission decoupled may additionally be assisted and prolonged by the starter or an electric motor (hybrid drive). This may take place either during the shut-down of the engine or, in the case of a vehicle with stop/start functionality, during a standstill period of the vehicle, in which the engine is automatically shut down. The enrichment with a high low-pressure EGR rate, as described above, can therefore be commenced during the overrun operation of the engine, and can merge possibly seamlessly into the shut-down of the engine.

According to the invention, it is preferably the case in said phases of regeneration in overrun operation that the low-pressure EGR valve is completely opened in order that as large as possible an exhaust-gas flow of at least 50%, preferably at least 80% and particularly preferably approximately 100% Is conducted in a circuit through the low-pressure EGR line (14), the engine (1) and the nitrogen oxide storage catalytic converter (5). To attain a high low-pressure EGR rate, the other valves (10) and/or (11) may simultaneously be closed to a greater or lesser extent. Alternatively, the exhaust-gas flow which is not conducted via the low-pressure EGR line may be recirculated via the high-pressure EGR line (15—FIG. 2). The recirculation of the exhaust gas via the low-pressure and high-pressure EGR lines can advantageously be used when it is sought to reduce the flow resistance of the exhaust gas in order to keep the braking of the engine as low as possible.

The air/fuel ratio (lambda) to be set during the regeneration should have a value of less than or equal to 1 ($\lambda \leq 1$). The measurement of the air/fuel ratio may be realized by means of known lambda sensors or oxygen sensors or NOx sensors (Handbuch Verbrennungsmotor [Internal Combustion Engine Handbook], van Basshuysen/Schäfer, ISBN 3-528-13933-1) or may be calculated by the engine control unit. Depending on the lambda sensor, the signal is output in mV or as a lambda value. According to the invention, the value lambda ($\lambda$) is to be regarded as a number describing the mixture composition composed of air and fuel. Other expressions in this regard are air-fuel ratio, air ratio number, air number, excess air and excess air number.

The combustion air ratio places the air mass $m_{A,act}$ actually available for combustion in a ratio with the minimum required stoichiometric air mass $m_{A,st}$ necessary for a complete combustion:

$$\lambda = \frac{m_{A,act}}{m_{A,st}}$$

If $\lambda=1$, then the ratio is the stoichiometric combustion air ratio with $m_{A,act}=m_{A,st}$, which is the case when all the fuel molecules can theoretically react completely with the oxygen in the air, without there being a lack of oxygen or unburned oxygen left over.

For internal combustion engines:
$\lambda<1$ (e.g. 0.9) means "a lack of air": rich mixture
$\lambda>1$ (e.g. 1.1) means "an excess of air": lean mixture
Evidence: $\lambda=1.1$ means that 10% more air participates in the combustion than would be necessary for a stoichiometric reaction. This is at the same time the excess of air. It is however preferable, during the regeneration, for an air-fuel mixture to be maintained which corresponds to a lambda value of 0.8 to 1. Said value particularly preferably lies between 0.85 and 0.99, very particularly preferably between 0.95 and 0.99.

In a special embodiment, surroundings data of the vehicle are used to calculate the onset and the duration of the overrun operation of the engine, and the regeneration of the nitrogen oxide storage catalytic converter, for example when the vehicle is approaching a red light or a speed restriction. Furthermore, it is for example possible for navigation data (GPS) or distance sensors to be used to predict the onset and end of the overrun operation, and to configure the regeneration to be as efficient as possible.

The temperature during the regeneration of the nitrogen oxide storage catalytic converter with regard to stored nitrogen oxides may be selected accordingly by a person skilled in the art. Said temperature should preferably lie between 150° C. and 500° C., particularly preferably between 200° C. and 450° C.

The regeneration method according to the invention can be carried out particularly advantageously with the following system for purifying the exhaust gases of a lean-burn engine. Here, the system has the following features:
- a unit for controlling the engine and the regulating devices of the system (ECU);
- a device for throttling the intake air (11);
- a first sensor for detecting the air/fuel ratio (12);
- a nitrogen oxide storage catalytic converter (5);
- a particle filter (6);
- a second sensor for detecting the air/fuel ratio (13);

a low-pressure EGR line (14) with a low-pressure EGR valve (9);

optionally, a device for reducing the discharge of the exhaust gas (10).

In an advantageous embodiment, the particle filter (6) is coated with a catalyst formulation which has characteristics selected from the group composed of oxidation catalyst, hydrogen sulfide ($H_2S$) blocking catalyst, SCR catalyst, nitrogen oxide storage catalyst, hydrocarbon store, three-way catalyst. The coating may be composed of one or more coating materials and catalytic properties, and may be applied either over the entire length of the filter or in zones at the inlet side and/or outlet side. Furthermore, the coating may also be applied in multiple layers on top of one another.

In a further advantageous embodiment, a catalytic converter (7) which has characteristics selected from the group composed of oxidation catalytic converter, $H_2S$ blocking catalytic converter, SCR catalytic converter, nitrogen oxide storage catalytic converter, hydrocarbon store, three-way catalytic converter is arranged downstream of the particle filter (6) and upstream of the low-pressure EGR line (14). Said optional catalytic converter (7) and also the particle filter (6) are still situated within the low-pressure circuit and can therefore continue to catalytically convert or adsorb the regeneration products during the regeneration of the nitrogen oxide storage catalytic converter. The catalytic converter (7) is particularly preferably an SCR catalytic converter with ammonia storage function.

Very particularly preferable is a system in which the particle filter (6) and the catalytic converter (7) have an SCR catalytic converter with ammonia storage function. This yields a further possibility for improved reduction of the nitrogen oxides, as a result of the increased formation of ammonia across the nitrogen oxide storage catalytic converter during the regeneration by means of the method according to the invention. This fact can be utilized to fill an ammonia store with the ammonia during the regeneration and to use said ammonia during the subsequent lean operation for additional NOx reduction, for example by means of an SCR catalytic converter.

In a further advantageous embodiment, the particle filter (6) has a coating with oxidation functionality and possibly hydrocarbon storage functionality, because said catalytic converter reaches its operating temperature most quickly after the nitrogen oxide storage catalytic converter (5) and can therefore assist the nitrogen oxide storage catalytic converter in the oxidation of hydrocarbons and CO, and prevents an increased emission of said exhaust-gas components even during the regeneration of the filter.

An $H_2S$ blocking catalyst function on the particle filter (6) and/or the optional catalytic converter (7) prevents any $H_2S$ formed during the desulfurization of the nitrogen oxide storage catalytic converter (5) from being discharged to the ambient air, in that it stores the $H_2S$ and, under lean exhaust-gas conditions, releases it again as sulfur dioxide ($SO_2$). Which of the stated functions are integrated in the particle filter (6) and/or catalytic converter (7) may vary depending on the application, and shall be specified by a person skilled in the art.

Particularly preferable is a system in which a further catalytic converter (8) with characteristics selected from the group composed of oxidation catalytic converter, $H_2S$ blocking catalytic converter, SCR catalytic converter, NOx storage catalytic converter, hydrocarbon store, three-way catalytic converter is situated in the exhaust section downstream of the low-pressure EGR line (14). Said optional catalytic converter (8) is situated outside the low-pressure EGR circuit and, if it is designed for example as an oxidation catalytic converter, can serve to oxidize incompletely burned reducing agent after the NSC regeneration. For this purpose, the catalytic converter (8) should have catalytic properties which permit both the oxidation of the reducing agent, such as for example Pt, Pd, Rh, Ag, Au, Fe, Cu, Co and Ni, and also oxygen storage materials, such as rare earth metal compounds for example of cerium, praseodymium, neodymium and yttrium, which can utilize the stored oxygen to convert reducing agent even in briefly substoichiometric exhaust gas.

As a result of the position of said catalytic converter (8) remote from the engine, and the resulting relatively low exhaust-gas temperatures, a coating is likewise particularly advantageous which effects an adsorption of exhaust-gas components, such as for example:

the adsorption of $H_2S$ in the $H_2S$ blocking catalytic converter during a desulfurization of the nitrogen oxide storage catalytic converter;

the adsorption of hydrocarbons for example in the hydrocarbon store or oxidation catalytic converter during a cold start of the engine or during the regeneration of the nitrogen oxide storage catalytic converter or particle filter;

the adsorption of nitrogen oxides for example in the SCR catalytic converter or nitrogen oxide storage catalytic converter in order to attain a further improvement in NOx conversion, in particular at engine operating points with increased exhaust gas temperatures, at which the NOx storage activity of the nitrogen oxide storage catalytic converter (5) is no longer sufficient for efficient exhaust-gas purification;

the adsorption of ammonia for example in the SCR catalytic converter in order to capture ammonia formed during the regeneration of the nitrogen oxide storage catalytic converter.

The catalytic converter (8) very particularly preferably has an oxidation catalytic converter and/or $H_2S$ blocking catalytic converter.

Catalytically active coatings with different functions may optionally likewise be applied in zones and/or in layers on the optional catalytic converters (7) and (8) and on the NOx storage catalytic converter (5), wherein here, the coatings are preferably applied to a honeycomb-shaped support body, which is commonly referred to as a throughflow monolith.

In a further preferred embodiment, an oxidation catalytic converter or three-way catalytic converter (TWC) is arranged upstream of the nitrogen oxide storage catalytic converter (5) in order to attain improved conversion of hydrocarbons and CO. Furthermore, said optional catalytic converter may additionally also comprise a coating which partially oxidizes hydrocarbons supplied during the regeneration and converts said hydrocarbons into reducing agents such as partially oxidized hydrocarbons, CO and hydrogen, which permit improved regeneration of the nitrogen oxide storage catalytic converter. Said reactions are catalyzed in particular by catalysts containing Pt and Pd.

In a further advantageous embodiment, the nitrogen oxide storage catalytic converter (5) may also be integrated in the particle filter (6) and/or on the catalytic converter (7), as a result of which the nitrogen oxide storage catalytic converter (5) could be dispensed with.

Figure 2:
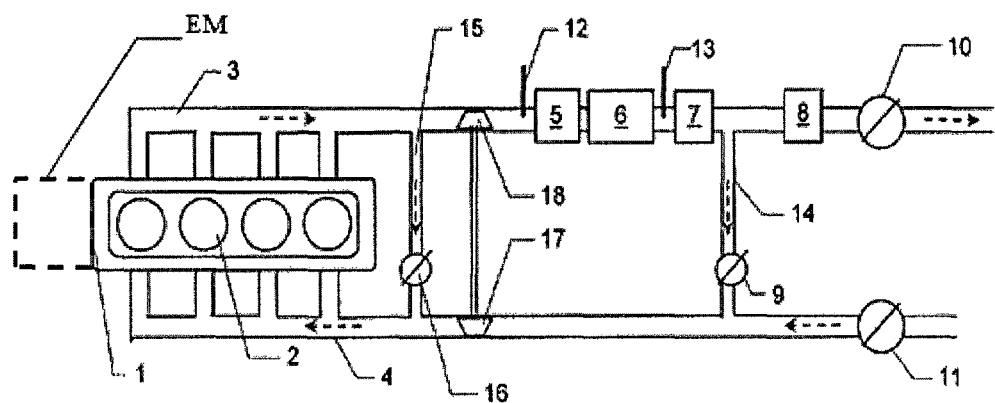
FIG. 2 shows an alternate system layout.

Likewise advantageous is a system in which—as shown in FIG. 2—an HP EGR line (15) is provided in addition to the measures described above.

The catalytic converters and component functions mentioned here emerge from the prior art. For example, EP 2112339 presents advantageous oxidation catalytic converters and particle filters. DE102009039249 and DE 102008048854 present nitrogen oxide storage catalytic converters which should preferably be used, and WO2011/023332 relates generally to storage materials which are advantageous for the invention.

In the present invention, a diesel engine is particularly preferably used as a lean-burn engine.

To improve the regeneration efficiency of a NOx-laden nitrogen oxide storage catalytic converter at low exhaust-gas temperatures (≤0.350° C., preferably ≤250° C., particularly preferably ≤200° C.), it is provided according to the invention that the duration of the regeneration is lengthened without the fuel consumption or the HC/CO emissions being significantly increased, for example through the application of the following method according to the invention:

An exhaust system of a lean-burn engine comprising a nitrogen oxide storage catalytic converter and a possibly coated DPF (particle filter) and also a device for low-pressure exhaust-gas recirculation (EGR) is operated as follows:

1. The lean-burn engine is operated with a lean combustion process (normal operation) and the exhaust gas is conducted through a nitrogen oxide storage catalytic converter and a possibly coated DPF, wherein a part of the nitrogen oxides is stored in the nitrogen oxide storage catalytic converter and a part of the soot particles is separated in the DPF.

2. When the nitrogen oxide storage catalytic converter must be regenerated in order to continue to maintain its purification efficiency, a phase of driving operation in which the engine is in overrun operation is utilized for this purpose. During said phase (operation during which normally no fuel is injected into the engine), advantageously 100% of the exhaust gas is recirculated back to the engine. This is achieved in that, at the start of the phase, the low-pressure EGR valve (9) is opened, the supply of fuel for generating work is ended, and at the same time either the throttle flap (11) for the intake air or else the exhaust-gas flap (10) is approximately completely closed. The sequence and speed of the adjustment of the actuators preferably takes place in a manner coordinated with the respective driving situation, such that undesired pressure surges, noises and vibrations can be prevented or reduced. At the same time, the required fuel quantity for attaining the regeneration lambda value is advantageously calculated from the following variables: volume of the circuit path and present state of the gas situated in the circuit path (such as pressure, temperature and lambda). Furthermore, the required fuel quantity necessary for the reduction of the nitrogen oxides presently stored in the nitrogen oxide storage catalytic converter (5) and possibly further catalytic converters (6) and (7), and of the oxygen which may be stored, is preferably calculated. The two calculated fuel quantities are dosed into the circuit path partially and/or in steps or completely preferably by means of one or more fuel nozzles. The regeneration lambda value to be set should have values of lambda ≤1. The injection of fuel is then shut off.

3. The rich exhaust gas is now conducted in a circuit via the nitrogen oxide storage catalytic converter and the filter, and further fuel can be injected if required, for example if lambda rises to values of greater than 1. The required fuel quantity can be determined from the lambda value upstream of the nitrogen oxide storage catalytic converter and/or downstream of the nitrogen oxide storage catalytic converter and from the volume of the circuit path and the exhaust-gas recirculation rate. The end of the regeneration is reached upon the complete reduction of the nitrogen oxides stored in the nitrogen oxide storage catalytic converter, when the idle rotational speed is reached, when the engine comes to a stop, or upon a demand for power from the engine.

4. When the end of the regeneration has been reached, the exhaust gas (10) and/or throttle flap (11) is opened again, the low-pressure EGR rate is reduced by adjusting the valve (9), and the combustion mixture is set to lean operation again. To prevent the reducing-agent-enriched exhaust gas which is conducted in a circuit from being discharged completely and abruptly to the ambient air in the process, which would result in an intense rise in HC and CO emissions, the following method is proposed: after the end of the regeneration, there is admixed into the low-pressure gas circuit only such an amount of fresh air that the mixture is made slightly lean, wherein a high EGR rate of over 50%, preferably of over 80%, particularly preferably of approximately 100% continues to be maintained until advantageously the excess reducing agent has for the most part been oxidized across the catalytic converters (5, 6, 7). Only thereafter is the complete switch made back to normal lean operation. The sequence and speed of the adjustment of the actuators preferably takes place in a manner coordinated with the respective driving situation, such that undesired pressure surges, noises and vibrations can be prevented or reduced.

Furthermore, the driving characteristics should as far as possible not be adversely affected during the regeneration, because according to the invention the regeneration takes place when the engine does not need to do work. This also reduces the risk of oil dilution during the regeneration as per the method according to the invention. It is furthermore possible for the OBD (on-board diagnosis) of the nitrogen oxide storage catalytic converter to be carried out during the method.

The method may also be applied at relatively high exhaust-gas temperatures. Advantages here include:

Lower fuel consumption during the regeneration

Additional operating states in which a regeneration is possible.

Reduced generation of exothermic heat during the regeneration, and as a result, improved storage behavior of the nitrogen oxide storage catalytic converter after the regeneration Reduction of the NOx desorption peak at the start of the regeneration, because the desorbed NOx is conducted multiple times across the nitrogen oxide storage catalytic converter via the low-pressure EGR system, and is then reduced in rich conditions.

Reduction of the $N_2O$ emissions during the regeneration as a result of the $N_2O$ being conducted multiple times across the nitrogen oxide storage catalytic converter under rich operating conditions.

High $NH_3$ yield as a result of the possibility of NOx being reduced multiple times across the nitrogen oxide storage catalytic converter to form $NH_3$.

Reduction of hydrocarbon and CO emissions during the regeneration as a result of more efficient utilization of the reducing agent.

The method according to the invention can be utilized not only for the NOx regeneration of NOx storage catalytic converters but also for the desulfurization (sulfur regeneration) of NOx storage catalytic converters. According to the invention, therefore the expression "regeneration of the nitrogen oxide storage catalytic converter" is to be understood to mean both the restoration of the storage capacity of the catalytic converter through the removal of the nitrogen oxides and also of the stored sulfur oxides. It is not imperative for both to take place at the same time.

Nitrogen oxide storage catalytic converters are impaired in terms of their functionality by sulfur contained in the fuel and the engine oil, because said nitrogen oxide storage catalytic converters bond the sulfur, which passes into the exhaust gas, in the form of very stable sulfates, which comes at the expense of the nitrogen oxide storage capacity. A desulfurization is to be understood within the context of this invention to mean the breakdown of the sulfates formed, and the emission thereof as hydrogen sulfide or preferably as sulfur dioxide. For this purpose, the exhaust gas must be brought to desulfurization conditions, that is to say it must be enriched and its temperature must be increased.

A person skilled in the art is familiar with the fact that, in the nitrogen oxide storage catalytic converter, sulfur oxides are much more firmly bonded than nitrogen oxides. Accordingly, the conditions under which a regeneration of the nitrogen oxide storage catalytic converter with regard to the sulfur oxides takes place must be selected more drastically than is described above for the regeneration of the nitrogen oxide storage catalytic converter with regard to the nitrogen oxides. A detailed description can be found in: "Untersuchungen zum Einsatz elnes NOx-Speicherkatalysators am Dieselmotor" ["Tests regarding the use of a NOx storage catalytic converter on the diesel engine"], P. Kattwinkel, VDI, Series 12, no. 638, ISBN 978-3-18-363812-3. In principle, the above-described method according to the invention and also the system according to the Invention can also be used for the regeneration of the nitrogen oxide storage catalytic converter with regard to the sulfur oxides. The preferred and advantageous embodiments presented there accordingly apply analogously, taking into consideration the conditions to be adhered to, for the desulfurization of the nitrogen oxide storage catalytic converter.

When a nitrogen oxide storage catalytic converter is loaded with a sulfur-containing exhaust gas, the storage catalytic converter therefore must not only undergo the regular regeneration for the removal of the stored nitrogen oxides but must also be desulfurized from time to time in order to reverse a continuous deterioration of the nitrogen oxide storage capacity caused by sulfates which are formed. The interval between two desulfurizations is self-evidently dependent on the sulfur content of the fuel, but even in the case of high sulfur contents is significantly longer than the interval between two regenerations for removing the stored nitrogen oxides, and is generally normally several hours or days, or a driving distance of approximately 1000-6000 km.

The air ratio $\lambda$ of the exhaust gas should for this purpose be reduced to a value between 1 and 0.7, preferably to 0.99 to 0.8, and particularly preferably to 0.97 to 0.90. During the desulfurization, the exhaust-gas temperature is at a value of >500° C., preferably between 500° C. and 850° C., and particularly preferably between 550° C. and 750° C.

For the desulfurization, a time of 2 to 15 minutes is usually required depending on the level of sulfurization and the temperature during the desulfurization. The desulfurization is usually carried out such that, when the desulfurization temperature is reached, driving is carried out alternately under rich/lean conditions such that as far as possible the sulfur is desorbed as $SO_2$ and not as $H_2S$ and such that the catalytic converter is kept at the desulfurization temperature (in this regard, see also the literature cited above). Furthermore, for reasons of drivability, it is difficult in the case of diesel engines for driving to be carried out under rich conditions for long periods of time. In practice, therefore, driving is carried out with a rich/lean alternation of 5-10 s rich and 5-20 s lean. The entire desulfurization therefore likewise lasts significantly longer than the nitrogen oxide regeneration of the storage catalytic converter, which lasts only a few seconds. By means of the method according to the invention, it is however possible for the rich periods during the desulfurization to be extended over the entire duration of the overrun operation of the engine, which may last significantly longer than the maximum of 10 seconds that is otherwise conventional. A lengthened rich period in turn assists in driving the sulfur out of the nitrogen oxide storage catalytic converter as quickly as possible.

A desulfurization comes at the expense of fuel consumption and, owing to the relatively high exhaust-gas temperatures required, can lead to rapid aging of the catalytic converters. Therefore, motor vehicles with lean-burn internal combustion engines are preferably sold on the European market, because fuels sold here have a sulfur content of less than 10 ppm. In the USA, although exhaust gas legislation is particularly stringent, the sulfur content here in fuel for spark-ignition engines is however presently still up to 30 ppm. In other regions, the sulfur content in the fuel is considerably higher still.

The development of motor vehicles with lean-burn engines for markets with high sulfur content in the fuel must therefore also take into consideration that, in this case, the nitrogen oxide storage catalytic converters must be frequently desulfurized. In addition to the abovementioned disadvantages of frequent desulfurization, specifically the increased fuel consumption and the high temperature loading of the catalytic converters, a further disadvantage is the increased emissions of hydrocarbons and nitrogen oxides during the desulfurization. The emissions during a desulfurization are very high because, for the desulfurization, a rich exhaust-gas mixture is required in order to be able to drive the sulfur in the form of hydrogen sulfide or sulfur dioxide out of the nitrogen oxide storage catalytic converter. Rich exhaust gas contains high concentrations of unburned hydrocarbons, carbon monoxide and nitrogen oxides and ammonia formed on the catalytic converters from the nitrogen oxides. Since the rich exhaust gas contains not enough oxygen to convert said components on the catalytic converters, said pollutants are therefore normally discharged, without purification, into the atmosphere.

Through the use of the method and system according to the invention likewise for desulfurizing the NOx storage catalytic converter, the increased pollutant emissions during the desulfurization can be substantially suppressed, because during the desulfurization, analogously to the regeneration with regard to the nitrogen oxides, the components are not emitted during this process. An arrangement as per FIG. 1 or 2 is preferable for this purpose. It has proven to be particularly advantageous for an $H_2S$ blocking catalyst function to be arranged downstream of the NOx storage catalytic converter (5) but still within the low-pressure EGR circuit, that is to say on the particle filter (6) and/or the optional catalytic converter (7), which $H_2S$ blocking catalyst function is capable of filtering hydrogen sulfide ($H_2S$) out of the exhaust gas under rich exhaust-gas conditions and subsequently releasing it back to the exhaust gas in the form of sulfur dioxide ($SO_2$) under lean exhaust-gas conditions. Particularly preferable, therefore, is an exhaust-gas purification system in which the particle filter (6) and/or the catalytic converter (7) is coated with an $H_2S$ blocking catalyst function.

For the sulfur regeneration (desulfurization) of the NOx storage catalytic converter (5), the system according to the invention is operated, in principle, using the same method according to the invention as that described in the introduction. The specifics to be observed have been discussed further above. It should also be noted that, during the desulfurization of the nitrogen oxide storage catalytic converter, the stored sulfur compounds are broken down to form volatile sulfur components such as for example $H_2S$ and $SO_2$ and are desorbed from the NOx storage catalytic converter. The $H_2S$ is stored on the $H_2S$ blocking catalytic converter function advantageously arranged downstream, and the $SO_2$ is conducted in a circuit until it has likewise been reduced in the rich exhaust gas to form $H_2S$ and has been stored in the $H_2S$ blocking catalytic converter. The end of the desulfurization is reached upon the complete reduction of the sulfur oxides stored in the nitrogen oxide storage catalytic converter, when the idle rotational speed is reached, when the engine comes to a stop, or upon a demand for power from the engine.

When the end of the regeneration has been reached, the exhaust gas (10) and/or throttle flap (11) is opened again, the low-pressure EGR rate is reduced by adjusting the valve (9), and the combustion mixture is set to lean operation again. To prevent the reducing-agent-enriched exhaust gas which is conducted in a circuit from being discharged completely and abruptly to the ambient air in the process, which would result in an intense rise in HC and CO emissions, the following method is proposed:

1. After the end of the regeneration, there is admixed into the low-pressure gas circuit only such an amount of fresh air that the mixture is kept only minimally rich (for example lambda=0.98-0.999), wherein a high EGR rate of over 80%, preferably of over 90%, particularly preferably of over 95% continues to be maintained until advantageously the excess reducing agent has for the most part been oxidized across the catalytic converters (5, 6, 7).
2. Only thereafter is the complete switch made back to normal lean operation. The sequence and speed of the adjustment of the actuators preferably takes place in a manner coordinated with the respective driving situation, such that undesired pressure surges, noises and vibrations are prevented or reduced.
3. After the switch to lean operation, the sulfur components stored by the $H_2S$ blocking catalytic converter are released in the form of $SO_2$ into the exhaust gas.

It is advantageous to ensure that, during the desulfurization, the lambda value does not increase above 1, in order to prevent a situation in which, in the method, sulfur components stored in the $H_2S$ blocking catalytic converter are desorbed again as $SO_2$ and are supplied via the low-pressure EGR back to the NOx storage catalytic converter and stored again as sulfates. Furthermore, it is advantageous if, after the end of the desulfurization and directly after the switch to lambda >1, the low-pressure EGR is as far as possible completely shut off until the $H_2S$ blocking catalytic converter has been completely emptied of $H_2S$ by the desorbing of $SO_2$, in order to prevent $SO_2$ from being supplied via the low-pressure EGR to the NOx storage catalytic converter again in a lean atmosphere.

The method for desulfurizing nitrogen oxide storage catalytic converters is advantageously applied such that, whenever the temperature in the nitrogen oxide storage catalytic converter reaches values above the desulfurization temperature, the method is carried out in overrun operating phases. Since temperatures of over 500° C. are usually required in order to desulfurize the nitrogen oxide storage catalytic converter, possibilities for desulfurization are provided for example during a descent (overrun operation) after a relatively long ascent (increased load demand and temperature rise), or before/after or during a DPF regeneration, when overrun operation takes place. In a further advantageous embodiment of the invention, the desulfurization can also be carried out such that, after the desulfurizing temperature is reached in the nitrogen oxide storage catalytic converter, firstly the exhaust gas is set to values of lambda ≤1 and subsequently, after approximately 5-30 s, the low-pressure EGR rate is set to values close to 100%. This possibly has the advantage that $SO_2$ formed at the start of the desulfurization can still be discharged to the atmosphere without having to be conducted in the circuit beforehand, and only the $H_2S$ formed later during the desulfurization is conducted in the circuit and stored in the $H_2S$ blocking catalytic converter.

The method according to the invention for desulfurizing the nitrogen oxide storage catalytic converter offers the following advantages over a conventional desulfurization without the use of the method:

1. Considerably reduced HC, CO, $NH_3$, NOx and particle emissions during the desulfurization, since the rich exhaust gas is not continuously produced and emitted but rather is conducted in the circuit;
2. The desulfurization may be carried out during the DPF regeneration, when overrun operation is present;
3. The desulfurization can take place in additional operating states of the engine;
4. Considerably reduced fuel consumption during the desulfurization, because only a small amount of fuel is required to set the exhaust gas in the low-pressure EGR into a rich state;
5. Reduction of the thermal aging of the NOx storage catalytic converter as a result of lengthening of the rich phases and therefore reduction of the rich/lean alternation which is definitive of the catalytic converter aging;
6. Reduction of the oil dilution effect during the desulfurization;
7. More efficient desulfurization through the possibility of driving for longer periods of time under rich conditions, which is practicable only with difficulty in normal driving operation for reasons of driving comfort, emissions and oil dilution, for example.

The regulation of the regeneration of the NOx storage catalytic converter is realized by an electronic control unit (ECU) in the vehicle. A person skilled in the art is highly familiar with the configuration and execution of such electronic regulating programs.

As a result of the more efficient regeneration of the nitrogen oxide storage catalytic converter according to the present invention, it is possible for less noble metal to be used in the system, because higher noble metal quantities are otherwise required in order to be able to regenerate the nitrogen oxide storage catalytic converter even at low temperatures. Furthermore, the driving characteristics are not impaired during the regeneration, and oil dilution is minimized. This could not have been anticipated against the background of the known prior art.

Possible system layouts are illustrated by way of example in FIG. 1 and FIG. 2.

1) Engine
2) Cylinder
3) Exhaust system
4) Intake air system
5) NOx storage catalytic converter
6) Particle filter
7) Optional catalytic converter
8) Optional catalytic converter (may also be arranged downstream of (10))
9) Low-pressure EGR valve 10) Exhaust flap
11) Throttle flap
12) Sensor for detecting the air/fuel ratio, for example lambda sensor
13) Sensor for detecting the air/fuel ratio, for example lambda sensor or NOx sensor (may also be arranged downstream of (5) or (7))
14) Low-pressure EGR line
15) High-pressure EGR line
16) High-pressure EGR valve
17) Compressor of the turbocharger
18) Turbine of the turbocharger

The invention claimed is:

1. A method for regenerating a nitrogen oxide storage catalytic converter which is arranged in an exhaust line of a lean-burn engine, wherein the engine is provided with a low-pressure EGR valve in a low-pressure EGR line and a device for reducing exhaust-gas discharge and/or a device for reducing the intake air, comprising:
performing an overrun operation of the engine, during which the engine does no positive work though continues turning over,
commencing regeneration of the nitrogen oxide storage catalytic converter during the overrun operation, and
during regeneration of the nitrogen oxide storage catalytic converter, throttling the intake air by the device for reducing the intake air and/or reducing the discharge of the exhaust gases by the device for reducing exhaust-gas discharge, and conducting at least a portion of the exhaust gas in a circuit through the low-pressure EGR valve via the engine and the nitrogen oxide storage catalytic converter, wherein
during regeneration of the nitrogen oxide storage catalytic converter, an air-fuel mixture is set to a lambda value of ≤1.

2. The method as claimed in claim 1, wherein
the engine is mounted in a vehicle, and performing the overrun operation of the engine comprises turning over the engine while the vehicle is driven under the action of the inertial or gravitational mass of the vehicle.

3. The method as claimed in claim 1, wherein
the engine is mounted in a vehicle, and performing the overrun operation of the engine comprises turning over the engine while the vehicle is driven under the action of an electric motor.

4. The method as claimed in claim 1, further comprising shutting down the engine, and performing the overrun operation during the shut-down of the engine.

5. The method as claimed in claim 1, further comprising opening the low-pressure EGR valve, and performing the commenced regeneration while the low-pressure EGR valve is completely open.

6. The method as claimed in claim 1, wherein
during the regeneration, maintaining an air-fuel mixture which corresponds to a lambda value of 0.8 to 1.

7. The method as claimed in claim 1, wherein
the engine is mounted in a vehicle, and calculating the onset and the duration of the overrun operation of the engine, and the regeneration of the nitrogen oxide storage catalytic converter, based on surroundings data of the vehicle.

8. The method as claimed in claim 1, wherein
performance of the commenced regeneration of the nitrogen oxide storage catalytic converter comprises reducing nitrogen oxides at temperatures of between 150° C. and 500° C. in the nitrogen oxide storage catalytic converter.

9. The method as claimed in claim 1, wherein
performance of the commenced regeneration of the nitrogen oxide storage catalytic converter comprises reducing sulfur oxides at temperatures above 500° C. in the nitrogen oxide storage catalytic converter.

10. A method for regenerating a nitrogen oxide storage catalytic converter which is arranged in an exhaust line of a lean-burn engine, wherein the engine is provided with a low-pressure EGR valve in a low-pressure EGR line and an exhaust-gas discharge valve and/or an intake air valve, comprising:
performing an overrun operation of the engine, during which the engine does no positive work though continues turning over,
regenerating the nitrogen oxide storage catalytic converter during the overrun operation, and
during regeneration of the nitrogen oxide storage catalytic converter, throttling the intake air by the intake air valve and/or reducing the discharge of the exhaust gases by the exhaust-gas discharge valve, and conducting at least a portion of the exhaust gas in a circuit through the low-pressure EGR valve via the engine and the nitrogen oxide storage catalytic converter, wherein
during regeneration of the nitrogen oxide storage catalytic converter, an air-fuel mixture is set to a lambda value of ≤1.

11. The method as claimed in claim 10, wherein
the engine is mounted in a vehicle, and performing the overrun operation of the engine comprises turning over the engine while the vehicle is driven under the action of the inertial or gravitational mass of the vehicle.

12. The method as claimed in claim 10, wherein
the engine is mounted in a vehicle, and performing the overrun operation of the engine comprises turning over the engine while the vehicle is driven under the action of an electric motor.

13. The method as claimed in claim 10, further comprising
shutting down the engine, and performing the overrun operation during the shut-down of the engine.

14. The method as claimed in claim 10, further comprising
opening the low-pressure EGR valve, and performing the commenced regeneration while the low-pressure EGR valve is completely open.

15. The method as claimed in claim 10, wherein
during the regeneration, maintaining an air-fuel mixture which corresponds to a lambda value of 0.8 to 1.

16. The method as claimed in claim 10, wherein
the engine is mounted in a vehicle, and calculating the onset and the duration of the overrun operation of the engine, and the regeneration of the nitrogen oxide storage catalytic converter, based on surroundings data of the vehicle.

17. The method as claimed in claim 10, wherein
performance of the commenced regeneration of the nitrogen oxide storage catalytic converter comprises reducing nitrogen oxides at temperatures of between 150° C. and 500° C. in the nitrogen oxide storage catalytic converter.

18. The method as claimed in claim 10, wherein
performance of the commenced regeneration of the nitrogen oxide storage catalytic converter comprises reducing sulfur oxides at temperatures above 500° C. in the nitrogen oxide storage catalytic converter.

* * * * *